United States Patent
Ben-Dosa

(10) Patent No.: US 9,789,423 B2
(45) Date of Patent: Oct. 17, 2017

(54) FILTRATION APPARATUS AND METHOD FOR TREATING GRANULAR FILTRATION MEDIUM

(75) Inventor: Haim Ben-Dosa, Herzliya (IL)

(73) Assignees: LIQUID AUTOMATION LTD., Herzliya (IL); KESSLER ILAN MANAGEMENT AND DEVELOPMENT (2001) LTD., Ness Ziona (IL)

(*) Notice: Subject to any disclaimer, the term of this patent is extended or adjusted under 35 U.S.C. 154(b) by 454 days.

(21) Appl. No.: 13/176,917

(22) Filed: Jul. 6, 2011

(65) Prior Publication Data
US 2012/0031857 A1    Feb. 9, 2012

Related U.S. Application Data

(63) Continuation-in-part of application No. PCT/IL2010/000160, filed on Feb. 25, 2010.

(30) Foreign Application Priority Data

Feb. 26, 2009 (IL) .......................... 197322
Jul. 6, 2010 (IL) .......................... 206841

(51) Int. Cl.
    *B01D 24/46*    (2006.01)
    *C02F 1/00*     (2006.01)

(52) U.S. Cl.
    CPC .......... *B01D 24/4689* (2013.01); *C02F 1/001* (2013.01); *B01D 2201/208* (2013.01); *C02F 2301/024* (2013.01); *C02F 2303/16* (2013.01)

(58) Field of Classification Search
    CPC .... B01D 24/12; B01D 24/30; B01D 24/4631; B01D 24/4689; B01D 24/28; B01D 24/36;
    (Continued)

(56) References Cited

U.S. PATENT DOCUMENTS

| 381,373 A | * | 4/1888 | Herschel | ................... G01F 1/44 |
| | | | | 73/861.63 |
| 1,620,431 A | * | 3/1927 | Bramwell | ..................... 210/189 |

(Continued)

FOREIGN PATENT DOCUMENTS

| BE | 335 057 | 7/1926 |
| CH | 171 708 | 9/1934 |

(Continued)

OTHER PUBLICATIONS

Upp, E. Loy, Fluid Flow Measurement—A Practical Guide to Accurate Flow Measurement, 2002, Elsevier, 2nd ed., p. 23.*

(Continued)

*Primary Examiner* — Bobby Ramdhanie
*Assistant Examiner* — Patrick Orme
(74) *Attorney, Agent, or Firm* — Nixon & Vanderhye P.C.

(57) ABSTRACT

A filtration apparatus whose interior is divided into a filtrate zone and a filtering zone. The filtering zone is adapted to receive a stream of raw-water and a lower portion of its volume is filled with filtering grains, and the filtrate zone is adapted to receive a filtrate obtained from passage of said stream of raw-water via the filtering grains and a perforated member. The apparatus further includes a pressure reducing device in fluid communication with the lower portion of the filtering zone and with an upper portion thereof. The pressure reducing device is adapted to receive a stream of water and responsively to continuously remove filtering grains from said filtering zone and separate filtration residues therefrom by the reduction of pressure conditions thereinside, and direct a stream comprising the stream of water and the separated filtering grains and filtration residues to the upper portion of said filtering zone.

27 Claims, 12 Drawing Sheets

(58) Field of Classification Search
CPC ............. B01D 24/40; B01D 2201/208; B01D 2101/04; C02F 1/001; C02F 1/004; C02F 2301/024; C02F 2301/046; C02F 2301/02; C02F 2301/04; C02F 2303/16
USPC .... 210/189, 195.1, 268, 275, 287, 291, 196, 210/269, 416.1, 792, 793
See application file for complete search history.

(56) References Cited

U.S. PATENT DOCUMENTS

| | | | | |
|---|---|---|---|---|
| 3,930,518 | A | * | 1/1976 | Fuller ................. F16K 17/20 137/487 |
| 4,102,786 | A | | 7/1978 | Okada et al. |
| 4,464,255 | A | | 8/1984 | Ueda |
| 5,019,278 | A | * | 5/1991 | Jacquet ...................... 210/792 |
| 5,277,829 | A | | 1/1994 | Ward |
| 5,785,846 | A | | 7/1998 | Barnes et al. |
| 6,077,446 | A | * | 6/2000 | Steiner et al. ............... 210/760 |
| 6,517,712 | B2 | | 2/2003 | Xia et al. |
| 2004/0050762 | A1 | | 3/2004 | Xia et al. |

FOREIGN PATENT DOCUMENTS

| | | | | |
|---|---|---|---|---|
| CH | 171708 | A | * 9/1934 | ............. B01D 24/12 |
| FR | 800 848 | | 7/1936 | |
| JP | 8215509 | | 8/1996 | |
| JP | 8266815 | | 10/1996 | |
| WO | 2004/022199 | | 3/2004 | |

OTHER PUBLICATIONS

Weber, K.P., Processes and Machines for Knitwear Product, 2006, Textile Technology, Hanser Publishers, pp. 152-153.*
CH171708A, European Patent Office English Machine Translation.*
Lancaster, "Rainwater Harvesting for Drylands and Beyond," http://www.harvestingrainwater.com/rainwater-harvesting-inforesources/suppliers/full-port-valves-for-gravity-fed-tankscisterns/, accessed 2014, 6 pages.*
CH171708A, USPTO English Translation.*
International Search Report for PCT/IL2010/000160, mailed May 20, 2010.

* cited by examiner

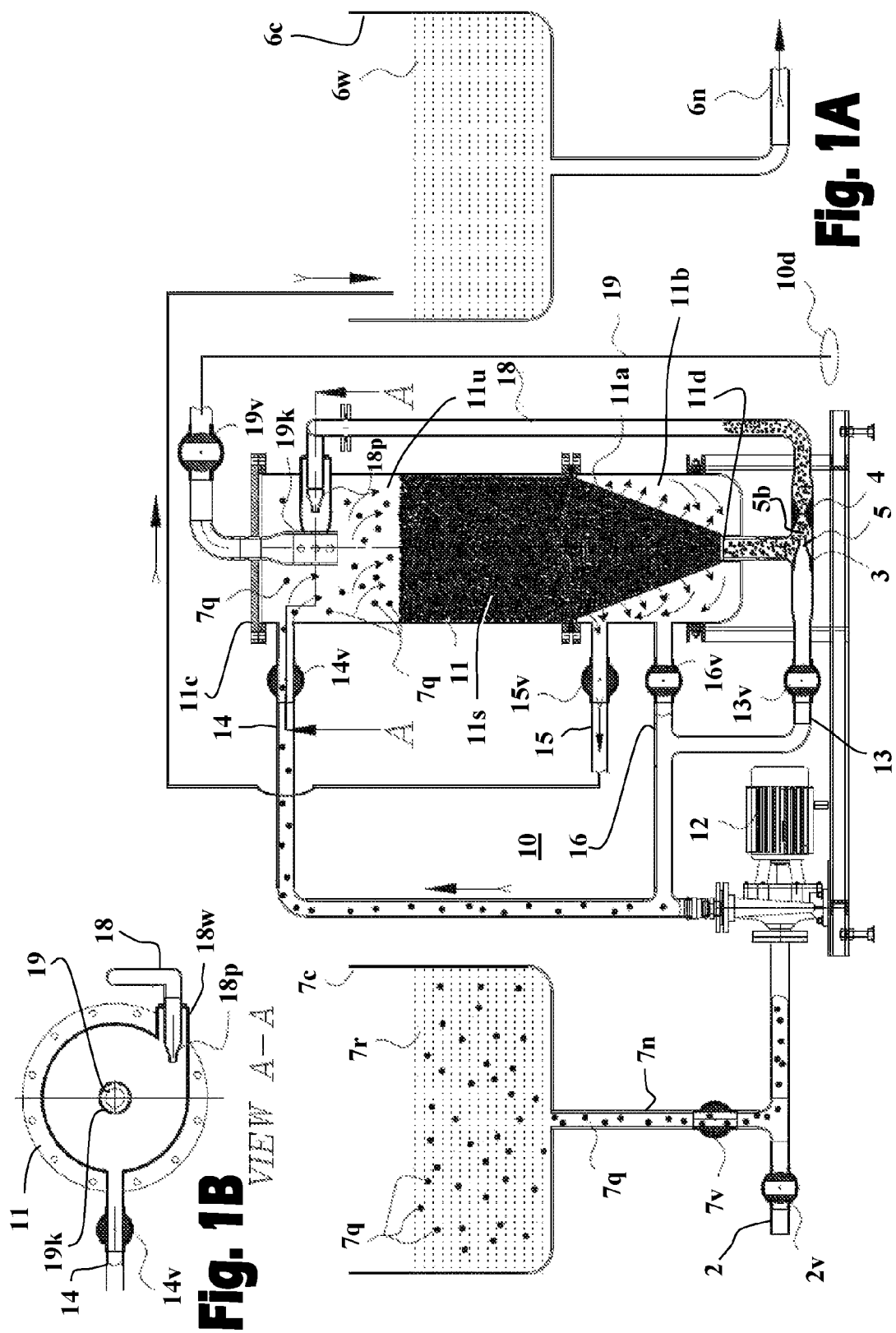

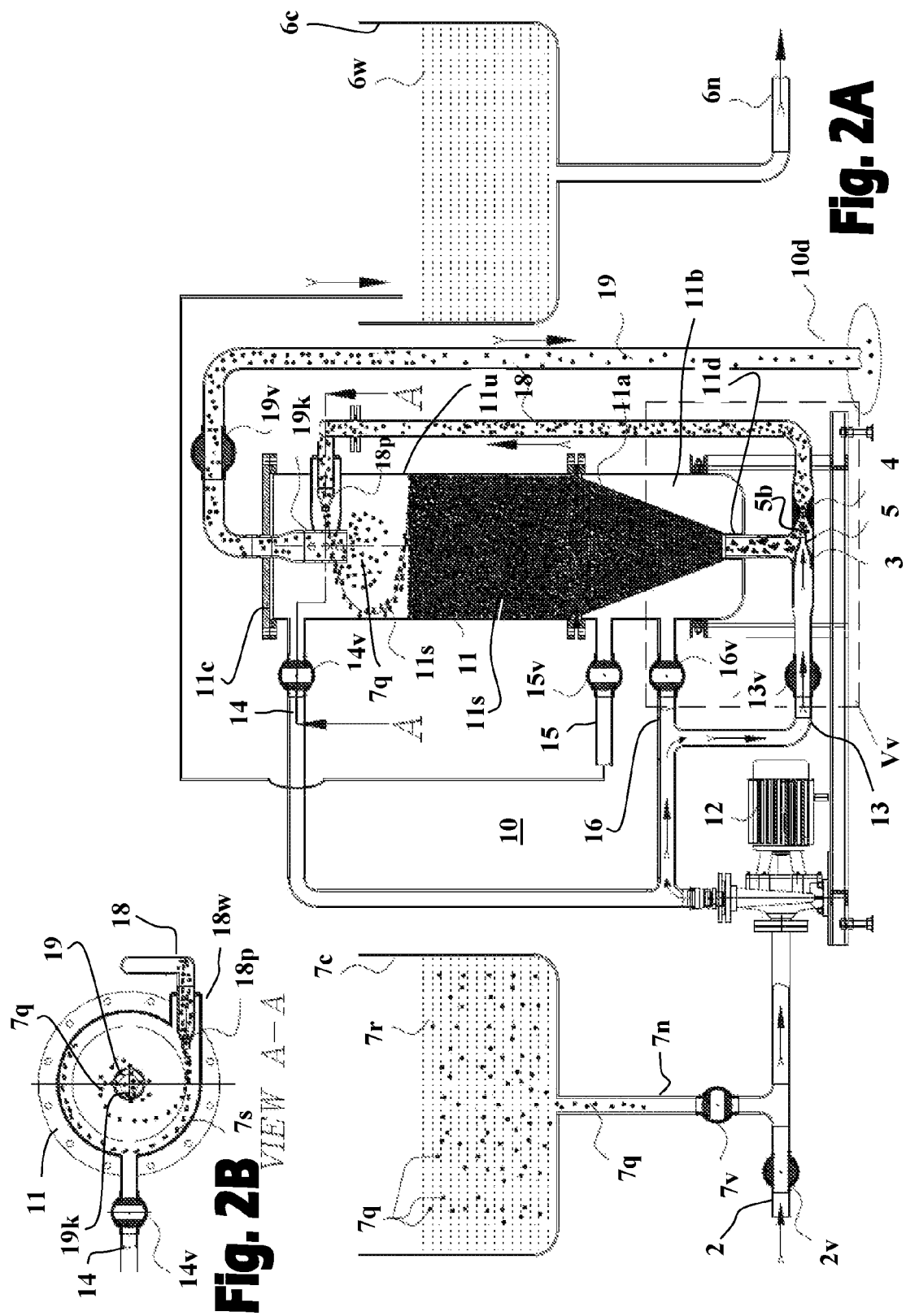

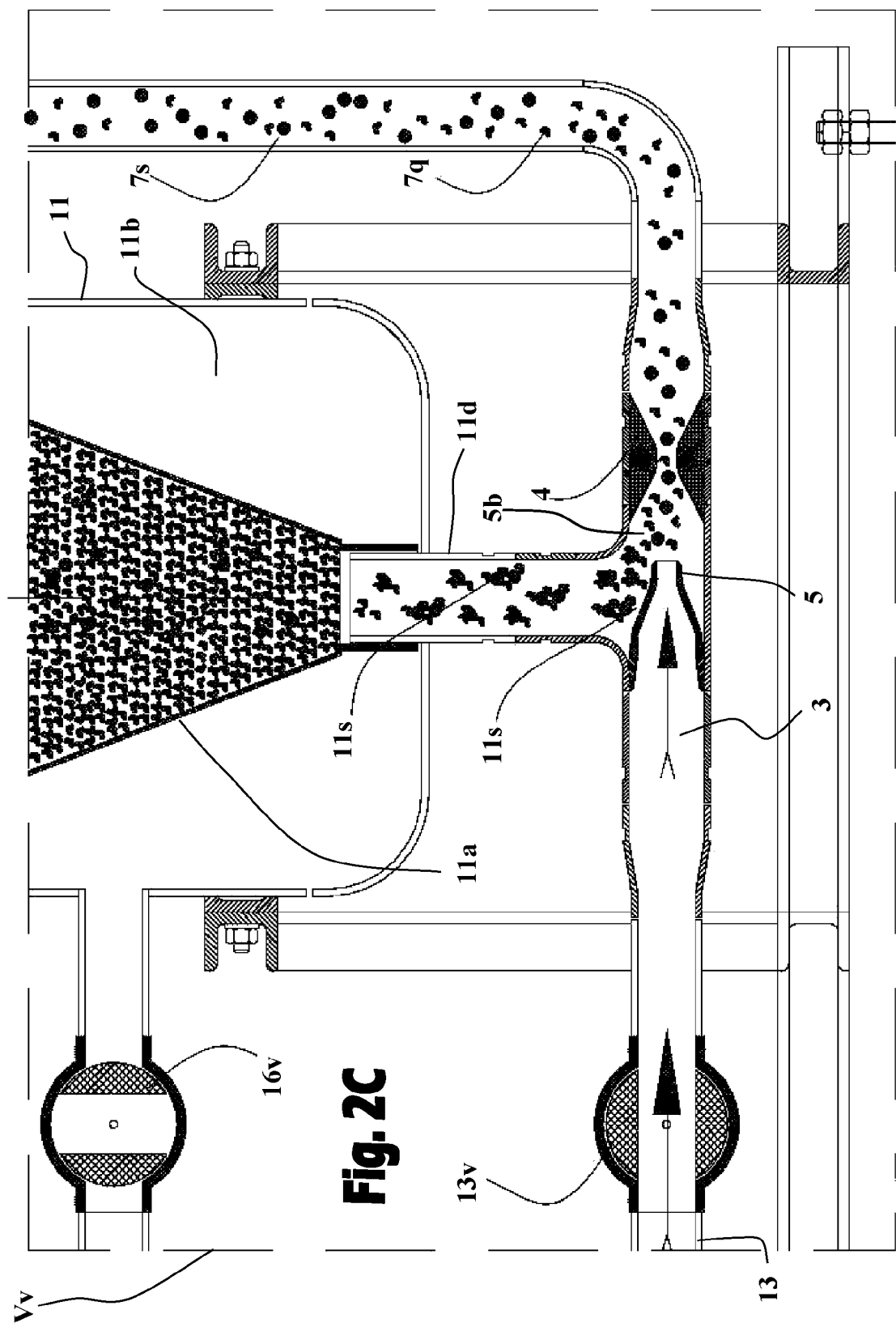

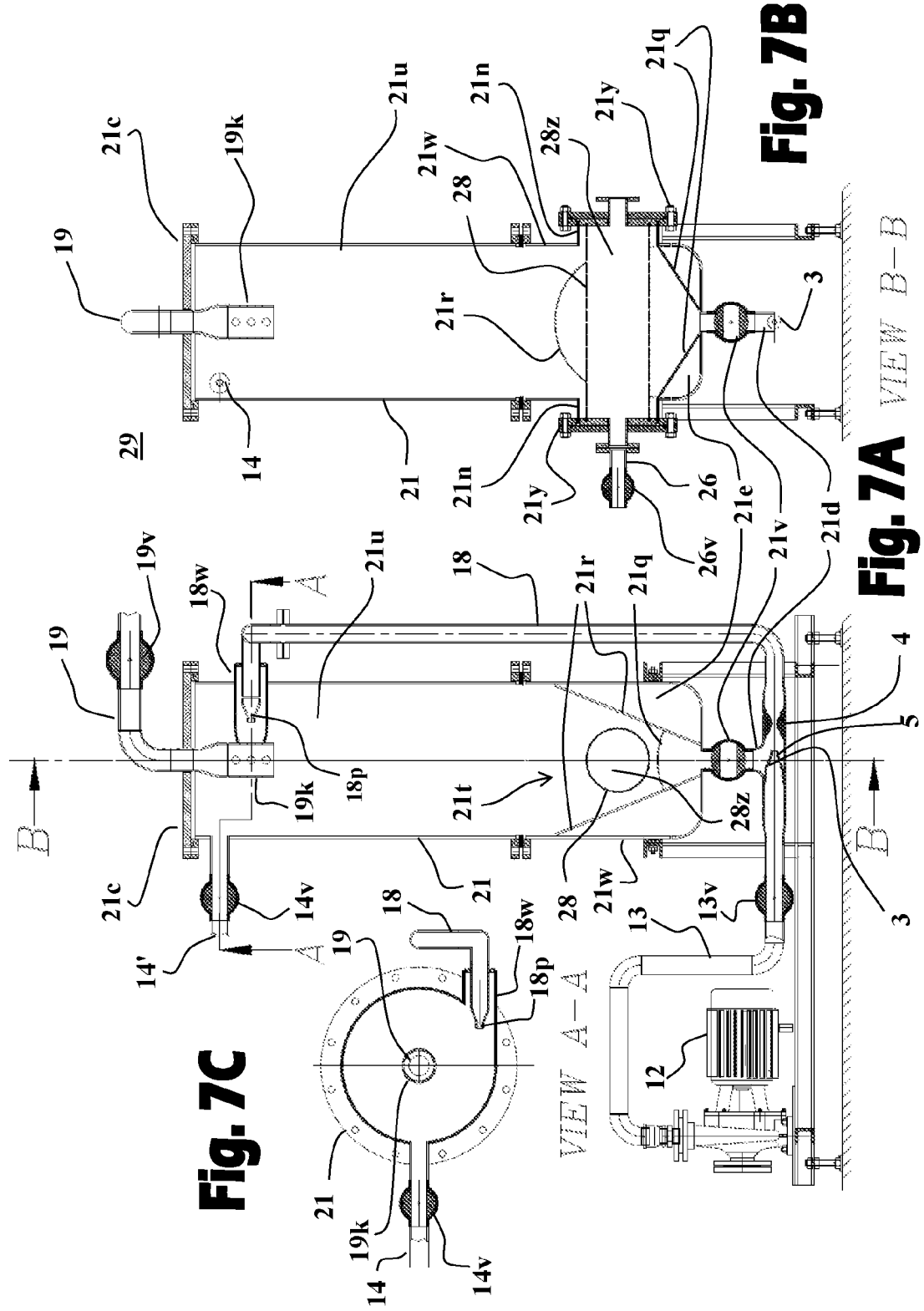

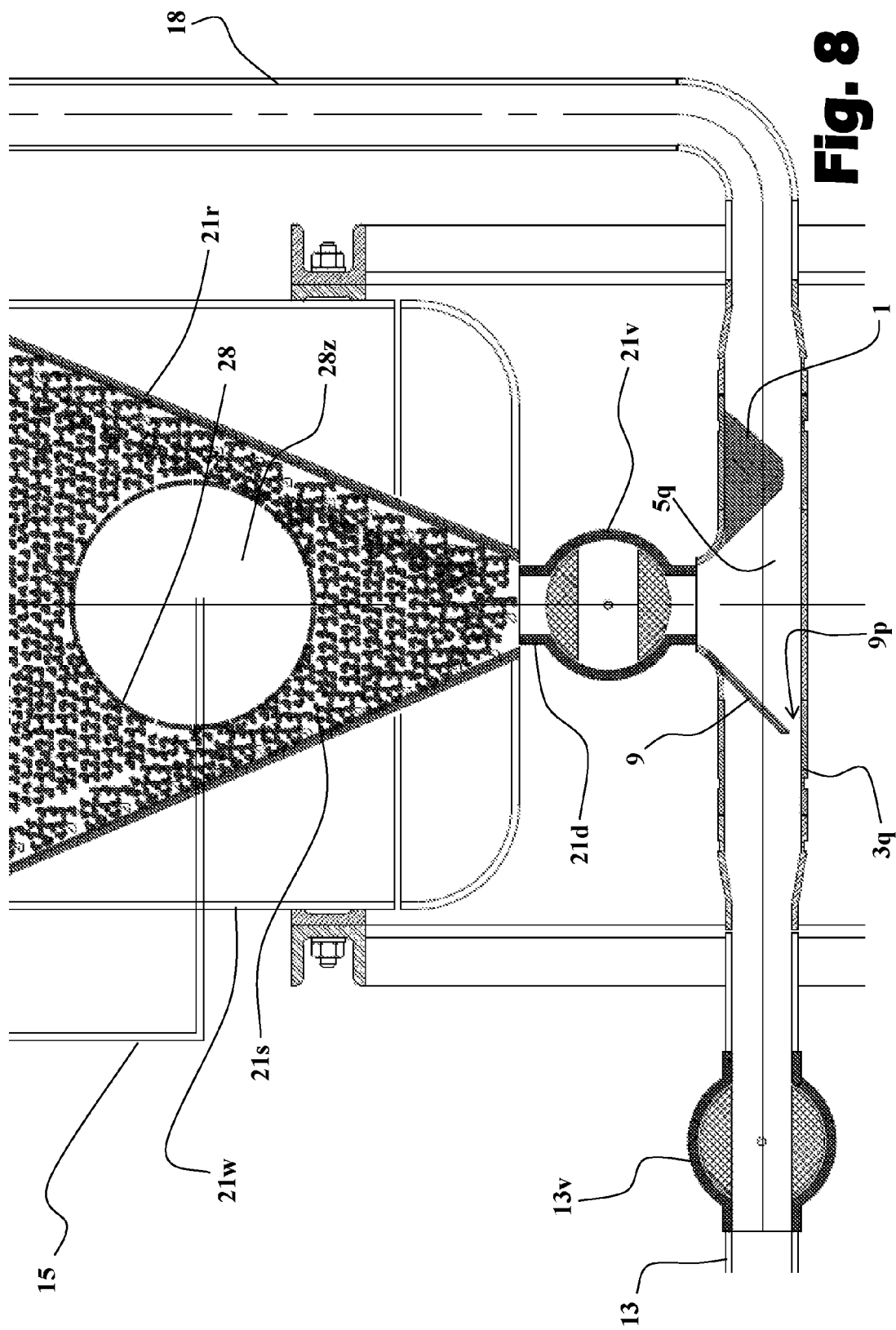

FILTRATION APPARATUS AND METHOD FOR TREATING GRANULAR FILTRATION MEDIUM

This application is a continuation-in-part of International Application No. PCT/IL2010/000160 filed 25 Feb. 2010 which designated the U.S. and which claims priority to IL Patent Application No. 197322 filed 26 Feb. 2009, and claims the benefit of priority to IL Patent Application No. 206841, filed 6 Jul. 2010, the entire contents of each of which are hereby incorporated by reference.

FIELD OF THE INVENTION

The present invention relates to a filtration apparatus and to a method and means for treating/refreshing granular filtration medium. More particularly, the invention relates to a method and apparatus for filtering raw liquid through filtering grains and effectively and rapidly treating clogged filtering grains and removing filtration residues therefrom.

BACKGROUND OF THE INVENTION

Granular filtration medium is occasionally used in the treatment of raw water (e.g., sewage, industrial effluents) for removing oily matter and insoluble solids suspended in the raw water. During the filtration process residual suspended material is filtered out and retained in the filter bed, and after a period of use the granulated medium becomes clogged due to formation of mud balls and solidifications caused by the filtration residuals.

For example in the sand and rubble stone depth filtration apparatus of AMIAD Filtration SYSTEMS (www.amiad.co.il/filters/sandMediaFilters_3.asp) the filtrate is passed from the filtration medium via an array of nozzles provided in the base of the vessel comprising the filtration medium. In this apparatus the filtration medium is typically comprised of two layers; a first layer of rubble stone which covers the array of nozzles, and a second layer of sand which covers the rubble stone layer, wherein the main purpose of the rubble stone layer is to prevent the fouling of the nozzles by sand particles. This array of nozzles is susceptible to fouling and thus requires frequent treatment or replacement.

Typically, a backwash or pressure wash process is applied in order to recover the clogged filtration medium and release the fouling of the nozzles. In order to effectively clean the granular filtration medium from the retained filtration residuals continuous backwash treatments are required, which consumes great amounts of fresh water. Furthermore, due to the frequent backwashes typically needed to open the clogged nozzles channels are formed over time in the filtration medium which significantly reduce the efficiency of the filtration apparatus due to the tendency of the raw water introduced into the device to pass through the formed channels directly to the nozzles i.e., without passing through the sand grains of the filtration medium.

A washer apparatus is described in JP 8215509 for washing and regenerating a clogged filter medium in a moving filter bed type filter using a granular filter medium such as sand, wherein contaminated filter medium is washed while rising in a screw conveyor vertically installed in the filter medium bed, in which the filter medium is crushed and then washed by an agitator.

JP 8266815 describes a device in which a filter medium is washed and circulated by means of a lift pipe vertically installed in the central part of the filter tank for conveying the filter medium.

In the device described in U.S. Pat. No. 4,102,786 clogged filter medium is treated by introducing upward current of water from the lower side of the filter bed and circulating filtering grains via a circulation line back into the device via the lower side of the filter bed, thereafter a current of rinsing water is introduced from the lower side of the bed to wash out filtration residuals.

The methods described above have not yet provided satisfactory solutions for rapidly and efficiently refreshing and restoring a clogged granular filtration medium with a relatively small amount of water.

It is therefore an object of the present invention to provide a filtration apparatus and method and apparatus for efficiently operating a granular medium filtration apparatus and for refreshing and regenerating clogged filter medium.

It is another object of the present invention to provide a method and apparatus for granulating a clogged filter medium, separating mud balls and other solidifications, and for washing out filtration residuals therefrom.

It is a further object of the present invention to provide a filtration apparatus employing a granular filtration medium which is less susceptible to blockage and which is easy and simple for maintenance.

Other objects and advantages of the invention will become apparent as the description proceeds.

SUMMARY OF THE INVENTION

The inventor of the present invention developed a device for refreshing (regenerating) clogged filtering grains maintained in a filtering column by generating reduced pressure conditions in a portion of a circulating line connected to the filtering column, such that portions of the filtering medium are discharged into the circulating line causing friction and high speed turbulences which separates formations of filtering granules and filtration residues. The reduced pressure conditions may be achieved by any suitable configuration (also referred herein as a pressure reducing device) capable of receiving a stream of water and substantially increasing its velocity in the portion of a circulating line such that portions of the filtering medium are sucked into it and streamed therefrom in said circulating line. The stream having increased fluid velocity preferably causes the low pressure conditions required for sucking portions of the filtering medium granules, applies a momentum over the sucked filtering medium granules for separating the filtration residues therefrom, and streams the same back into the filtering column.

The terms filtering granules and granular filtration medium used herein refer to any filtration medium comprised of particles having any geometrical shape in three dimensional space and made from any material suitable for filtration purposes. The terms refreshing and regenerating are used herein interchangeably to relate to the treatment process carried out for separating and removing filtration residues from the filtering medium granules.

Preferably, the reduced pressure conditions are caused due to a Venturi effect obtained in the said portion of circulating line. Most preferably, a type of Venturi device is used, said Venturi device is adapted to receive a stream of water (e.g., city tap water) and produce a pressurized stream having an increased fluid velocity thereby producing a Venturi effect thereinside capable of streaming portions of clogged filtering grains from a filtration apparatus, separating filtration residues therefrom, and directing a stream comprising the stream of water and the separated filtering grains and filtration residues back into the filtration apparatus.

The term Venturi effect used herein refers to the pressure reduction occurring when streaming a fluid through a slender passage (constriction) thereby causing increased fluid velocity therethrough.

In one aspect the present invention is directed to a filtration apparatus comprising: a filtering column which interior is divided by a perforated partition into a filtrate zone and a filtering zone, wherein said filtering zone is adapted to receive a stream of raw-water and a lower portion of its volume is filled with filtering grains, and wherein said filtrate zone is adapted to receive a filtrate obtained from passage of said stream of raw-water via said filtering grains and said perforated partition; and a pressure reducing device (e.g., Venturi device) in fluid communication with said lower portion of said filtering zone and with an upper portion thereof, wherein said pressure reducing device is adapted to receive a stream of water and responsively to continuously remove filtering grains from said filtering zone, separate filtration residues from said filtering grains by the reduction of pressure conditions evolving thereinside, and to direct a stream comprising said stream of water and said separated filtering grains and filtration residues to said upper portion of said filtering zone.

Advantageously, the pressure reducing device is adapted to increase the momentum of the stream of water such that separation of filtering grains and filtration residues is caused. The pressure reducing device preferably also generates a high speed turbulent flow in the stream comprising the filtering grains.

Preferably, the pressure reducing device is a type of Venturi device adapted to receive a stream of water and continuously remove filtering grains from the filtering zone and separate filtration residues therefrom by means of a Venturi effect. The Venturi device preferably comprises a pressure chamber having an inlet adapted to receive the stream of water and a tapering outlet adapted to produce a pressurized stream having an increased fluid velocity, thereby causing the Venturi effect. The Venturi device may further comprise a constriction placed upstream near the tapering outlet for increasing turbulence flow and thus promoting separation of filtration residues.

The stream comprising the stream of water and the separated filtering grains and filtration residues is introduced into the upper portion of the filtering zone, preferably through a nozzle, in a direction substantially tangential to the wall of the filtering column, such that the motion of the filtration residues having smaller masses progressively converge towards the center of the column. In this way a stream comprising filtration residues can be flown from said filtering zone to drainage via a drain port centrally located in the upper portion of the filtering zone.

One specific preferred embodiment of the invention is directed to a filtration apparatus comprising a filtering column which interior is divided by a perforated partition into a filtrate zone and a filtering zone, wherein said filtering zone is adapted to receive a stream of raw-water and a lower portion of its volume is filled with filtering grains, and wherein said filtrate zone is adapted to receive a filtrate obtained from passage of said stream of raw-water via said filtering grains and said perforated partition, wherein said perforated partition has a tapering shape (e.g., conical, funnel-shape) which tapers downwardly towards the base of said filtering column.

Advantageously, the perforated partition may comprise one or more nets placed thereon. Preferably said one or more nets comprises a fine net placed on said perforated partition and having holes of about half the size of the granules of the filtration medium, and a spatially curvatured net placed on said fine net and having holes size slightly smaller than the size of the granules.

According to another aspect the present invention is directed to a Venturi device for regenerating (refreshing) clogged filtering grains comprising a pressure chamber and a suction zone in fluid communication with a vessel comprising the filtering grains and in fluid communication with a fluid pipe, wherein the pressure chamber is adapted to receive a stream of water and produce a pressurized stream having an increased fluid velocity into the suction zone thereby causing a Venturi effect capable of streaming portions of the filtering grains from the vessel into the suction zone, separate filtration residues therefrom, and direct a stream comprising the stream of water and separated filtrating grains and the filtration residues into the fluid pipe.

According to yet another aspect the present invention is directed to a method for regenerating a clogged filtering medium maintained in a filtering column which interior is divided by a perforated partition into a filtrate zone and a filtering zone, wherein said filtering zone is adapted to receive a stream of raw-water and a lower portion of its volume is filled with filtering grains, the method comprising:

providing a Venturi device in fluid communication with the lower portion of the filtering zone and in fluid communication with an upper portion of the filtering zone, said Venturi device is adapted to received a stream of water and produce a Venturi effect thereinside;

directing a stream of water into said Venturi device thereby removing portion of the filtering grains and separating filtration residues therefrom by means of the Venturi effect occurring therein;

directing a stream comprising the stream of water and the separated filtering grains and filtration residues and introducing it into the upper portion of the filtering zone in a direction substantially tangential to the wall of the filtering column thereby causing a circular centrally converging flow of said filtration residues inside said column; and directing a stream comprising filtration residues from the filtering zone to drainage via a drain port centrally located in the upper portion of the filtering zone.

The inventor of the present invention developed a filtration apparatus and a device for refreshing (regenerating) clogged filtering grains maintained in a filtering column (also referred to herein as a filtration column) by means of a suction chamber capable of pumping portions of the filtering medium into said suction chamber, and causing and separates formations of filtering granules and filtration residues. A preferred approach for implementing the suction chamber is by generating reduced pressure conditions in the suction chamber connected to the filtering column by a first inlet, such that portions of the filtering medium are discharged into the suction chamber. A second inlet opening of the suction chamber is connected to a source of a pressurized stream causing friction and high speed turbulences of the filtration medium which separates formations of filtering granules and filtration residues.

The reduced pressure conditions may be achieved by any suitable configuration (also referred to herein as a pressure reducing device) capable of receiving the pressurized stream (e.g. stream of water) and substantially increasing its velocity in the portion of the suction chamber such that portions of the filtering medium are sucked into it and streamed therefrom and discharged into a circulation line which is in fluid communication with the upper portion of the filtration column. The stream having increased fluid velocity preferably causes the low pressure conditions required for sucking portions of the filtering medium granules, applies a momentum over the sucked filtering medium granules for separating the filtration residues therefrom, and streams the same back into the filtering column.

The terms filtering granules and granular filtration medium used herein refer to any filtration medium comprised of particles having any geometrical shape in three dimensional space and made from any material suitable for filtration purposes. The terms refreshing and regenerating are used herein interchangeably to relate to the treatment process carried out for separating and removing filtration residues from the filtering medium granules.

Preferably, the suction chamber is adapted to produce reduced pressure conditions by means of a Venturi effect obtained in the suction chamber. For example, a type of Venturi device may be used, said Venturi device is adapted to receive a stream of water (e.g., city tap water) and produce a pressurized stream having an increased fluid velocity thereby producing a Venturi effect thereinside capable of streaming portions of clogged filtering grains from a filtration apparatus, separating filtration residues therefrom, and directing a stream comprising the stream of water and the separated filtering grains and filtration residues back into the filtration apparatus.

The term Venturi effect used herein refers to the pressure reduction occurring when streaming a fluid through a slender passage (constriction) thereby causing increased fluid velocity therethrough.

In one aspect the present invention is directed to a filtration apparatus comprising: a filtering column which interior is divided by a perforated partition into a filtrate zone and a filtering zone, wherein said filtering zone is adapted to receive a stream of raw-water and a lower portion of its volume is filled with filtering grains, and wherein said filtrate zone is adapted to receive a filtrate obtained from passage of said stream of raw-water via said filtering grains and said perforated partition; and a suction chamber in fluid communication with said lower portion of said filtering zone and with an upper portion thereof, wherein said suction chamber is adapted to continuously remove filtering grains from said filtering zone, separate filtration residues from said filtering grains, and to direct a stream comprising said separated filtering grains and filtration residues to said upper portion of said filtering zone.

Most preferably, the suction chamber is adapted to receive a stream of water and responsively to continuously remove filtering grains from said filtering zone, separate filtration residues from said filtering grains by the reduction of pressure conditions evolving thereinside, and to direct a stream comprising said stream of water and said separated filtering grains and filtration residues to said upper portion of said filtering zone.

Advantageously, the suction chamber is adapted to increase the momentum of the stream of water such that separation of filtering grains and filtration residues is caused. The pressure reducing device preferably also generates a high speed turbulent flow in the stream comprising the filtering grains.

Advantageously, the suction chamber may be implemented by a type of Venturi device adapted to receive a stream of water and continuously remove filtering grains from the filtering zone and separate filtration residues therefrom by means of a Venturi effect. The suction chamber may comprise a pressure chamber having an inlet adapted to receive the stream of water and a tapering outlet adapted to produce a pressurized stream having an increased fluid velocity, thereby causing a Venturi effect. The suction chamber may further comprise a constriction placed upstream near the tapering outlet for increasing turbulence flow and thus promoting separation of filtration residues. Alternatively, the suction chamber may comprise a tongue element fixedly attached thereinside configured to produce the pressurized stream having an increased fluid velocity for pumping portions of the filtering grains from the filtering zone into the suction chamber and separate filtration residues therefrom.

The stream comprising the stream of water and the separated filtering grains and filtration residues is introduced into the upper portion of the filtering zone, preferably through a nozzle, in a direction substantially tangential to the wall of the filtering column, such that the motion of the filtration residues having smaller masses progressively converge towards the center of the column. In this way a stream comprising filtration residues can be flown from said filtering zone to drainage via a drain port centrally located in the upper portion of the filtering zone.

One specific preferred embodiment of the invention is directed to a filtration apparatus comprising a filtering column which interior is divided by a perforated partition into a filtrate zone and a filtering zone, wherein said filtering zone is adapted to receive a stream of raw-water and a lower portion of its volume is filled with filtering grains, and wherein said filtrate zone is adapted to receive a filtrate obtained from passage of said stream of raw-water via said filtering grains and said perforated partition, wherein said perforated partition has a tapering shape (e.g., conical, funnel-shape) which tapers downwardly towards the base of said filtering column.

Advantageously, the perforated partition may comprise one or more nets placed thereon. Preferably said one or more nets comprises a fine net placed on said perforated partition and having holes of about half the size of the granules of the filtration medium, and a spatially curvatured net placed on said fine net and having holes size slightly smaller than the size of the granules.

Optionally, the stream of raw water may be introduced into the filtering column via the circulation line used in the process of treatment of the filtration medium. A valve may be mounted in the line through which the filtration medium is introduced into the suction chamber, and by setting this valve into a closed state in the filtration process the stream of raw water may be passed through the pressure reducing device into the circulation line connected to it, and therethrough into the upper portion of the filtration column.

According to another aspect the present invention is directed to a suction chamber for regenerating (refreshing) clogged filtering grains comprising a pressure chamber and a suction zone in fluid communication with a vessel comprising the filtering grains and in fluid communication with a fluid pipe, wherein the pressure chamber is adapted to receive a stream of water and produce a pressurized stream having an increased fluid velocity into the suction zone thereby causing a reduced pressure conditions in the pressure chamber capable of discharging portions of the filtering grains from the vessel into the suction zone, separate filtration residues therefrom, and direct a stream comprising the stream of water and separated filtrating grains and the filtration residues into the fluid pipe.

According to another aspect the present invention is directed to a filtration apparatus comprising: a filtering column having a perforated hollow member mounted thereinside, thereby defining a filtrate zone inside the hollow perforated member and a filtering zone in the volume of the filtrating column external to the hollow perforated member (in which the filtration medium is maintained), wherein a portion of the filtering zone is filled with filtering grains up to a level sufficient for entirely covering the hollow perforated member, and wherein said filtrate zone is adapted to receive a filtrate obtained from passage of a stream of raw-water into the filtration column and passed through the filtering grains and the pores of the hollow perforated member.

The perforated hollow member preferably comprises at least one outlet suitable for streaming filtrate obtained in the filtrate zone to a filtrate reservoir. Optionally, the perforated hollow member may further comprise an inlet suitable for streaming fresh water into the filtrate zone for carrying out backwash operations.

Advantageously, the filtration apparatus may further comprise a suction chamber in fluid communication with the lower portion of the filtering zone and with an upper portion thereof, wherein the suction chamber is adapted to receive a stream of water and responsively to continuously remove filtering grains from said filtering zone, separate filtration residues from said filtering grains by the reduction of pressure conditions evolving thereinside, and to direct a stream comprising said stream of water and said separated filtering grains and filtration residues to said upper portion of said filtering zone. Alternatively, the suction chamber may comprise a tongue element fixedly attached thereinside configured to produce the pressurized stream having an increased fluid velocity for pumping portions of the filtering grains from the filtering zone into the suction chamber and separate filtration residues therefrom.

Advantageously, the perforated hollow member is a cylindrical hollow perforated element which external surface may be covered by one or more nets. The perforated hollow member is preferably adapted to prevent passage of filtration grains from the filtering zone into the filtrate zone. Preferably, the external surface of the perforated hollow member is covered by one or more fine net(s) and/or one or more spatially curvatured net(s). Most preferably, at least one fine net is attached over the external surface of the hollow perforated member and at least one spatially curvatured net is attached over the fine net. For example, the spatially curvatured net may be a type of interwoven net which is significantly less susceptible to fouling by filtration grains due to its interwoven structure.

Optionally, the lower portion of the filtration column may taper downwardly to define a tapering passage leading towards an opening provided in the base of the filtration column through which portions of filtration medium may be passed to the pressure reducing device. Alternatively, slanted surfaces may be mounted in the lower portion of the filtration column to form a tapering passage for the filtration medium to the opening in the base of the filtration column. Advantageously, the perforated hollow member is mounted above, or within the tapering passage.

Advantageously, the filtration apparatus may be operated carrying out filtration and filtration medium treatment operations concurrently.

According to still yet another aspect the present invention is directed to a method for regenerating a clogged filtering medium maintained in a filtering column which interior is divided by a perforated partition into a filtrate zone and a filtering zone, wherein said filtering zone is adapted to receive a stream of raw-water and a lower portion of its volume is filled with filtering grains, the method comprising:

providing a suction chamber in fluid communication with the lower portion of the filtering zone and in fluid communication with an upper portion of the filtering zone, said suction chamber is adapted to received a stream of water and produce a low pressure conditions thereinside;

directing a stream of water into said suction chamber thereby removing portions of the filtering grains and separating filtration residues therefrom by means of the reduced pressure conditions and increased fluid velocity obtained therein;

directing a stream comprising the stream of water and the separated filtering grains and filtration residues and introducing it into the upper portion of the filtering zone in a direction substantially tangential to the wall of the filtering column thereby causing a circular centrally converging flow of said filtration residues inside said column; and directing a stream comprising filtration residues from the filtering zone to drainage via a drain port centrally located in the upper portion of the filtering zone.

According to one specific preferred embodiment of the invention the interior of the filtering column is divided by a perforated hollow member into a filtering zone external to the perforated hollow member, in which filtering granules are placed to at least cover said perforated hollow member, and a filtrate zone residing inside the perforated hollow member.

According to a preferred embodiment of the invention, the invention relates to a filtration apparatus comprising: a filtration column having a perforated hollow member mounted inside it to define a filtrate zone therein and a filtering zone in the volume of said filtration column external to said hollow perforated member, wherein a portion of said filtering zone is filled with filtering grains up to a level sufficient for entirely covering said hollow perforated member, and wherein said filtrate zone is adapted to receive a filtrate obtained from passage of a stream of raw-water introduced via the upper portion of the filtration column and passed through the filtering grains and the perforations of the hollow perforated member.

Preferably, the perforated hollow member comprises at least one outlet for streaming filtrate obtained in the filtrate zone to a filtrate reservoir.

Preferably, the perforated hollow member comprises an inlet suitable for streaming fresh water into the filtrate zone for carrying out backwash.

According to a very preferred embodiment of the invention, the apparatus further comprises a suction chamber having a first inlet opening connected to the lower section of the filtration column; a second inlet opening connected to a source of a pressurized stream; and an outlet opening connected to a circulation line which is in fluid communication with the upper portion of the filtration column.

Preferably, the apparatus further comprises a constriction situated near to the suction chamber outlet.

Preferably, the circulation line enters the upper portion of the filtering zone in an orientation substantially tangential to the wall of the filtering column.

Preferably, the apparatus further comprises a drain port centrally located in the upper portion of the filtering zone.

Preferably, the perforated hollow member is a cylindrical hollow perforated element which is situated in the filtration column such that the longitudinal axes of said column and said cylindrical element are substantially perpendicular.

The present invention preferably relates to a method for cleaning a clogged filtering medium held in a filtering column, the interior of which is divided by a hollow perforated member into a filtrate zone and a filtering zone, said method comprising the steps of:
  discharging at least a portion of said clogged filtering medium into a chamber;
  directing a pressurized stream of water into said chamber thereby removing filtration residues from said filtration medium by means of turbulent flow inside said chamber to form a high velocity stream comprising water, filtration medium and the removed filtration residues;
  directing said stream from an outlet of chamber through a circulation line into the upper portion of said filtering zone in a direction substantially tangential to the wall of said filtering column thereby causing a circular centrally converging flow of filtration residues inside said column; and
  removing said filtration residues from said filtering zone via a drain port located in the center of the upper section of said filtration column.

Preferably, the method is carried out concurrently with a filtration of raw water.

BRIEF DESCRIPTION OF THE DRAWINGS

The present invention is illustrated by way of example in the accompanying drawings, in which similar references consistently indicate similar elements and in which:

FIGS. 1A and 1B schematically illustrate the apparatus of the invention operated during the filtering of raw water, wherein FIG. 1A shows a sectional view of the apparatus and FIG. 1B shows a cross-sectional view of the upper portion of the filtering column;

FIGS. 2A to 2E schematically illustrate the apparatus of the invention during restoration of the granular filtration medium and removal of the filtration residuals, wherein FIG. 2A shows a sectional view of the apparatus, FIG. 2B shows a cross-sectional view of the upper portion of the filtering column, FIG. 2C is an enlarged view of bottom part of the filtration column designated in FIG. 2A by reference Vv comprising a suction chamber, FIG. 2D schematically illustrates one preferred multilayered implementation of the perforated funnel, and FIG. 2E illustrates a preferred embodiment of a suction port comprising lateral and bottom apertures;

FIGS. 4A and 4B schematically illustrate the apparatus of the invention during raw water filtration after regenerating/refreshing the filtration medium, wherein FIG. 4A shows a sectional view of the apparatus and FIG. 4B shows a cross-sectional view of the upper portion of the filtering column;

FIGS. 7A to 7D schematically illustrate few sectional views of the filtration column shown in FIGS. 5 and 6, wherein FIG. 7A illustrates a sectional side-view of the apparatus, FIG. 7B illustrates a sectional side view of the filtration column (90° rotated side view) of the filtration apparatus, FIG. 7C illustrates a cross-sectional view of the upper portion of the filtering column; and FIG. 7D shows a perspective and sectional views of the bottom part of the filtration column; and FIG. 8 schematically illustrates an embodiment of the suction chamber comprising a tongue element.

Figure 2D:
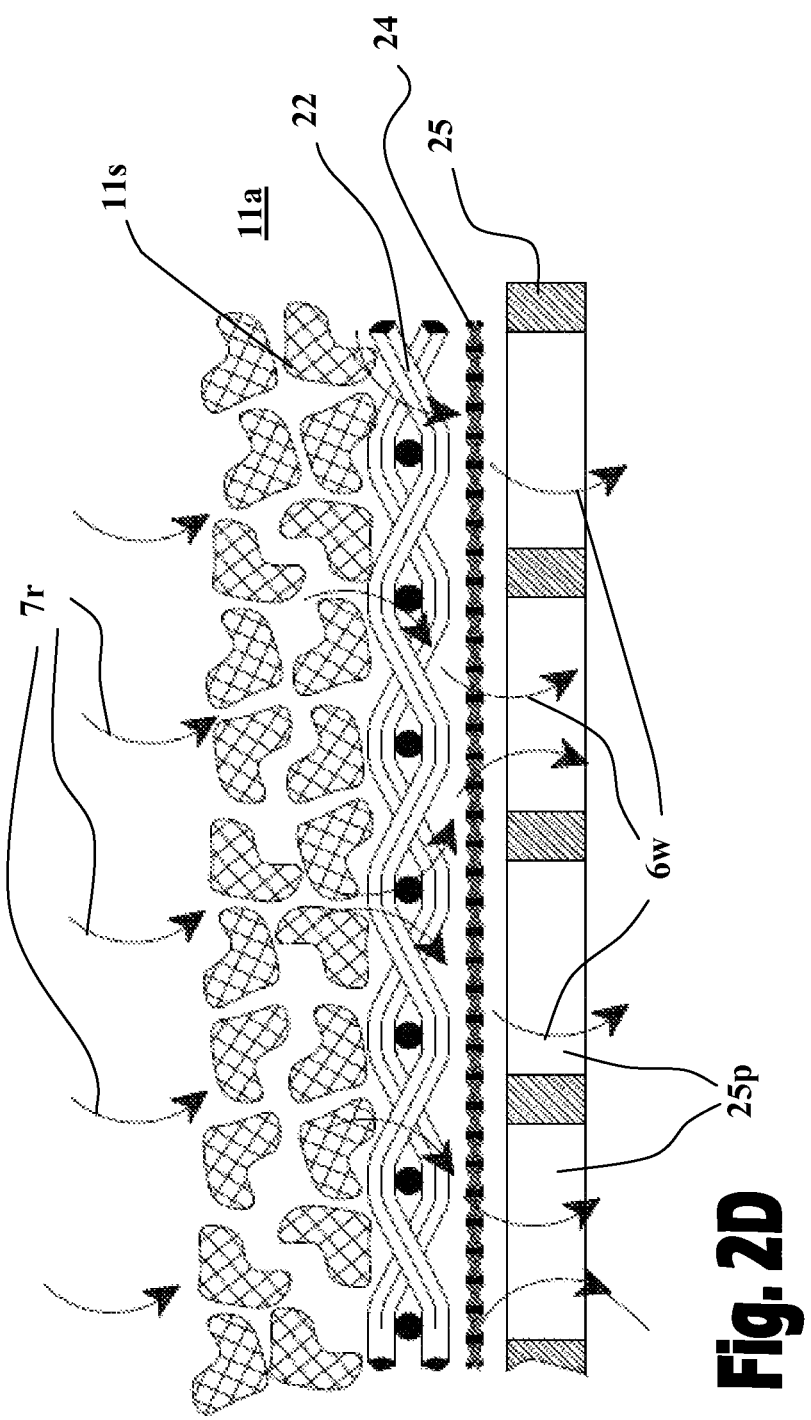

It is noted that the embodiments exemplified in the Figs. are not intended to be in scale and are in diagram form to facilitate ease of understanding and description.

DETAILED DESCRIPTION OF PREFERRED EMBODIMENTS

Treatment of clogged granular filtration medium in prior art systems is typically carried out by means of a circulation process used for separating the filtration residues from the filtering medium by friction or other mechanical means and then washing out the filtration residues by a stream of water. The present invention provides a new filtration apparatus and a new technique employed therein for refreshing and restoring a clogged filtration medium by streaming clogged filtration medium from a filtration column through a suction chamber used for breaking solidifications of filtration residues and filtering grains, and thereafter separating the filtration residues from the filtering grains by introducing the stream received from the suction chamber back into the filtering column in a circular motion such that centripetal forces cause a circular centrally converging flow of said filtration residues inside said column which draw the filtration residuals towards the column center wherefrom said residues are drained out.

FIG. 1A schematically illustrates a preferred embodiment of the present invention for a water filtration apparatus 10 employing a granular filtration medium 11$s$ (e.g., sand). Filtration apparatus 10 comprises a filtration column 11 connected by pipes to raw-water tank 7$c$ and filtered-water tank 6$c$. As will be described hereinafter, during filtration raw water 7$r$ from raw-water tank 7$c$ is passed through the granular filtration medium 11$s$ in filtration column 11, and the filtrate 6$w$ is then streamed into filtered-water tank 6$c$.

During the filtration process schematically illustrated in FIG. 1A suspended matter 7$q$ (also referred to herein as filtration residues) e.g., oily matter, organic materials, and/or insoluble solids, contained in raw water 7$r$ is captured in filtration medium 11$s$, which during continuous use cause formations with filtration medium grains 11$s$ and eventually clogs the filtration medium grains.

Filtration column 11 is generally a cylindrical vessel having a closed bottom and upper opening sealably closed by lid 11$c$. The upper portion of column 11 comprises two inlets: i) raw-water inlet accessed via valve 14$v$; and ii) circulation inlet (18$w$, FIG. 1B) through which circulation line 18 is introduced into column 11, and one outlet connected to drain line 19 passing through lid 11$c$.

At the bottom portion of column 11 there is mounted a perforated funnel 11$a$, which tapers towards the bottom of column 11, and which tapering end is connected to conduit 11$d$ passing through the bottom wall of column 11. Perforated funnel 11$a$ separates column 11 into two zones: filtration zone 11$u$, which is partially filled with filtration grains 11$s$; and filtrate zone 11$b$ having an outlet that can be accessed via valve 15$v$, and an inlet that can be accessed via valve 16$v$. Conduit 11$d$ sealably passes through the base of column 11 and connects to suction chamber 5$b$ (thus communicating between it and filtration zone 11u), comprising a tapered nozzle 5 and a slender passage 4 in a section of circulation pipe 18.

It is noted that perforated funnel 11a may be implemented by employing perforated means having other geometrical shapes and capable of partitioning the interior of column 11 as described above. For example, a perforated partition 11a may be implemented by means of a flat circular perforated piece of material (not shown) having a central opening to which conduit 11d may be connected. Of course, in such exemplary embodiment conduit 11d passing inside filtrate zone 11b should be lengthened in order to reach the perforated partition.

With reference to FIG. 1B, showing a cross-sectional view of column 11, circulation line 18 comprises a tapered nozzle 18p adapted to tangentially direct a stream into the upper portion of column 11.

When filtration is performed in apparatus 10, raw-water 7r is streamed from raw-water tank 7c through pipes 7n and 14 and pressurized into filtration column 11, by operating pump 12 and setting valves 7v and 14v into an open state and valve 2v in tap-water line 2 into a closed state. Since valve 19v in drain line 19 is in a closed state the pressurized raw-water 7r is forced to pass through the grains of filtration medium 11s and through the pores of perforated funnel 11a into filtrate zone 11b. The filtrate is then streamed into filtered-water tank 6c through filtrate line 15. Since valves 13v and 16v are in a closed state, water passing through the filtering grains 11s will pass into filtrate zone 11b, through the pores of perforated funnel 11a, and then into filtrate line 15.

As explained hereinabove, along continued use the amount of residual suspended material 7q retained in filtering grains 11s is increased which thus becomes clogged, resulting in increased pressure losses in the filtering bed and reduction in the filtering efficiency of apparatus 10, which requires refreshing and restoring filtering bed 11s.

FIG. 2A schematically illustrates apparatus 10 when regenerating filtration medium grains 11s. In this state filtrate outlet valve 15v and inlet valve 16v communicating with filtrate zone 11b, raw-water inlet valve 14v communicating with filtration zone 11u, and valve 7v communicating with raw-water tank 7c, are all in a closed state. Tap-water valve 2v and suction chamber valve 13v are in an opened stated for streaming tap water into suction chamber 5b by means of pump 12. Valve 19v in drain line 19 is also opened. In this preferred embodiment of the invention suction chamber 5b is implemented in an inverted "T" shape style formed by connection of conduit 11d at the center of suction chamber 5b, having pressure vessel 3 at one side of the "T" junction and constriction 4 at its other side.

With reference to FIG. 2C, showing an enlarged view of the bottom section of column 11 comprising suction chamber 5b, wherein tap water stream is pressurized by pump 12 through pipe 13 into pressure chamber 3 in suction chamber 5b from which it is discharged via tapered nozzle 5. As shown in FIG. 2C, the opening of nozzle 5 is placed more or less at the "T" shape junction, preferably towards the end of the junction.

The velocity of the stream of tap water discharged via tapered nozzle 5 is substantially increased and thus causing reduced pressure condition (as obtained by a Venturi effect) which applies suction forces through conduit 11d. Due to the suction applied by suction chamber 5b filtering medium 11s is streamed through conduit 11d into suction chamber 5b. The substantially high velocity stream discharged via tapered nozzle 5 generates a high speed turbulent flow in the section between nozzle 5 and constriction 4. The high speed turbulence and frictional forces applied in said section of suction chamber 5b due to the momentum of the streamed water, breaks formations of filtering grains and filtration residuals, such that in the stream of tap water and filter bed 11s passing through constriction 4 the binds between filtering grains (7s) and sustained residuals (7q) are broken.

Reverting to FIG. 2A, the stream discharged from suction chamber 5b is circulated through circulation line 18 back into column 11. With reference to FIG. 2B, the circulated stream is discharged from line 18 via tapered nozzle 18p in a tangential direction such that a circular motion of the discharged stream is obtained in the upper portion of column 11. Since the specific weight of the filtering grains 7s is greater than the specific weight of the sustained residuals 7q their motion is more or less adjacent to the wall of column 11, while the motion of sustained residuals 7q is progressively converging towards the center of column 11. Due to the positive pressure inside column 11 material from the central area of column 11 adjacent suction port 19k is sucked to drain 10d via drain line 19, thereby discarding sustained residuals 7q.

In one specific preferred embodiment of the invention a valve is provided in conduit 11d (not shown), said valve is used for closing the passage of filtering grains through conduit 11d once the regeneration (grains refreshing) stage is finished and during the filtration stage. Such valve in conduit 11d may be further utilized for streaming the raw water into the filtering column via the circulation line 18. More particularly, by closing the valve in conduit lid raw water 7r may be streamed via suction chamber 5b into circulation line 18, and through it into the upper portion 11u of the filtering column 11. Accordingly, raw water 7r may be streamed into the filtration zone 11u via circulation line 18 and/or via pipe 14.

FIG. 2D schematically illustrates a possible multilayered embodiment of perforated funnel 11a. In this preferred embodiment perforated funnel 11a comprises a pierced layer 25 made from a suitable metallic (e.g., tin) or plastic material and having apertures 25p of about 6 mm in diameter, a fine net 24 placed on pierced layer 25 and having thickness of about 0.2 to 0.5 mm and holes size about half the size of the granules of filtration medium 11s, and a spatially curvatured net 22 placed on fine net 24 and having thickness of about 2 to 3 mm and holes size slightly smaller than the size of the granules of the used filtration medium 11s. For example, if the size of the filtering granules is of about 1 mm, then the hole size of fine net 24 may be of about 0.4 mm, and the hole size of spatially curved net 24 may be of about 0.75 mm. Spatially curved net 22 may be implemented by means of an interwoven net having a wavy configuration in three-dimensional space, such that it enables fluid flow through it even if it becomes partially blocked by the filtration granules 11q contacting it, as demonstrated in FIG. 2D.

This multilayered construction of perforated funnel 11a advantageously permits passage of the liquid obtained from the passage of raw water 7r through the filtration medium 11s through the fine net 24, substantially without meeting obstructions caused along its path by granules of the filtration medium 11s. In particular, the three-dimensional curving of spatially curvatured net 22 provides that there will always be an open passage through it for the liquid passing through the filtering grains 11s, even if portions of it holes become covered by filtration granules over time. Several trials showed that this multilayered structure substantially reduced fouling of perforated funnel 11a.

Figure 2E:
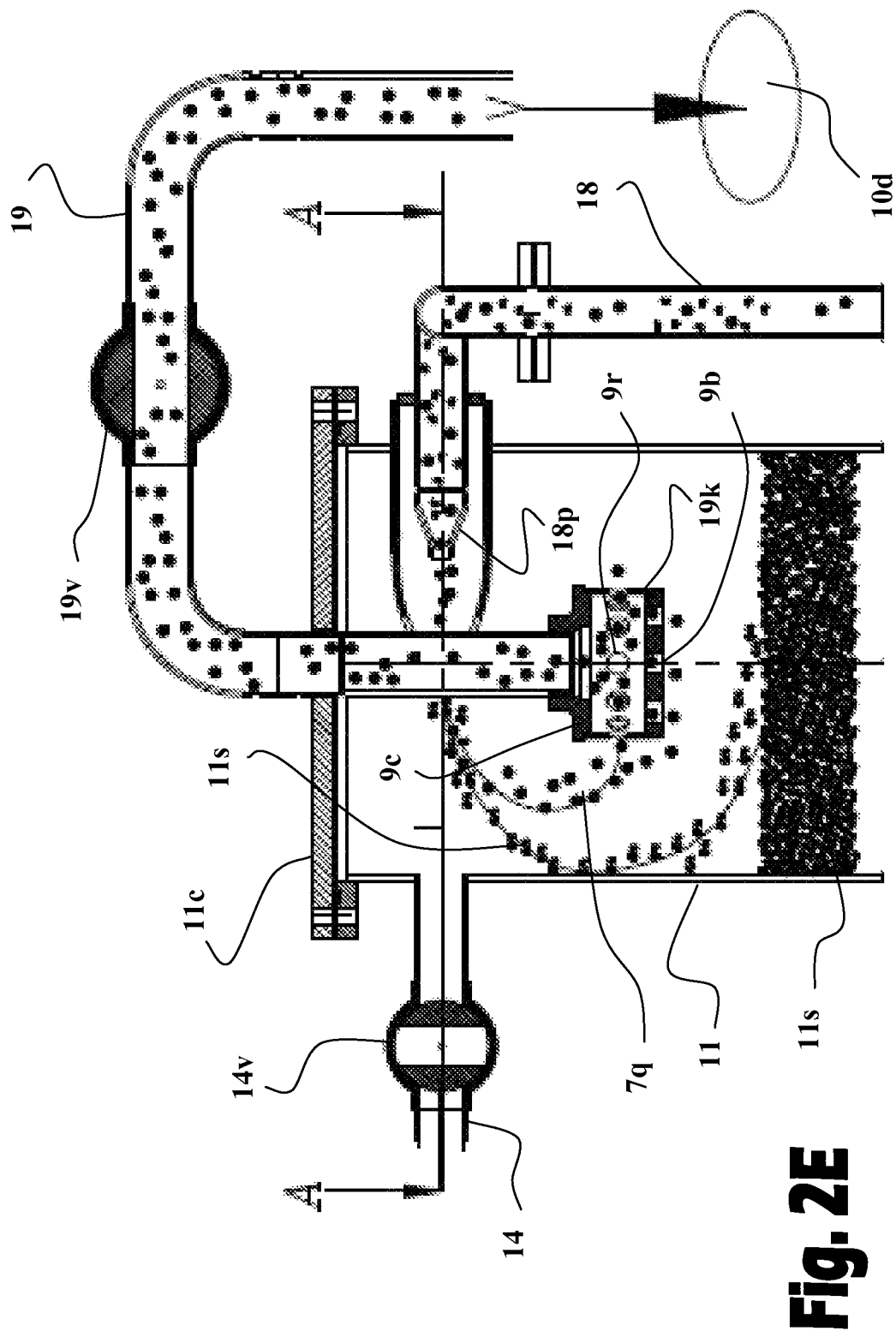

FIG. 2E illustrates a preferred embodiment of suction port 19k having a cup shape comprising a plurality of holes, and which is sealably closed by a cover 9c having an opening suitable for fitting it over the inlet of drain line 19. As seen, in this embodiment suction port 19k comprises a plurality of bottom holes 9b and lateral holes 9r having a diameter of about 20 to 30 mm. Suction port may be made from plastic or metal (e.g., tin).

Figure 3:
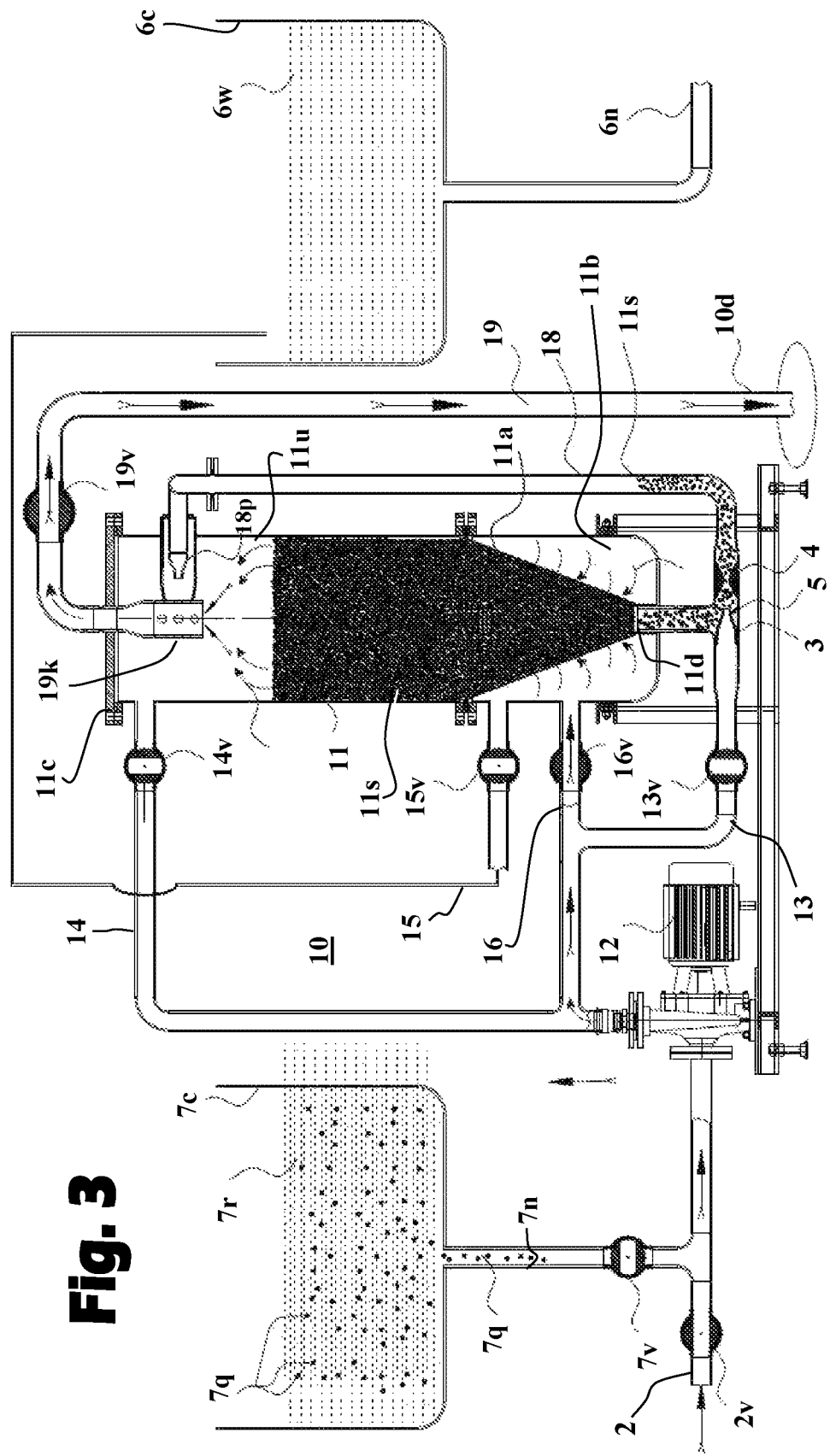
FIG. 3 schematically illustrates the apparatus of the invention during backwash phase.

FIG. 3 schematically illustrates a backwash step which may be carried out periodically to removes blockages from the perforated funnel 11a, after numerous regeneration steps are performed (e.g., five). In this backwash step water is streamed into filtrate zone 11b through pipeline 16 and drained via drain line 19, such that tap-water valve 2v, inlet valve 16v and drain valve 19v, are in an open state, and all other valves (13v, 15v, 7v and 14v) are in a closed state in this step. In this optional backwash step the water stream introduced into filtrate zone 11b passes via the pores of perforated funnel 11a and wash out residuals therefrom.

Figure 4:
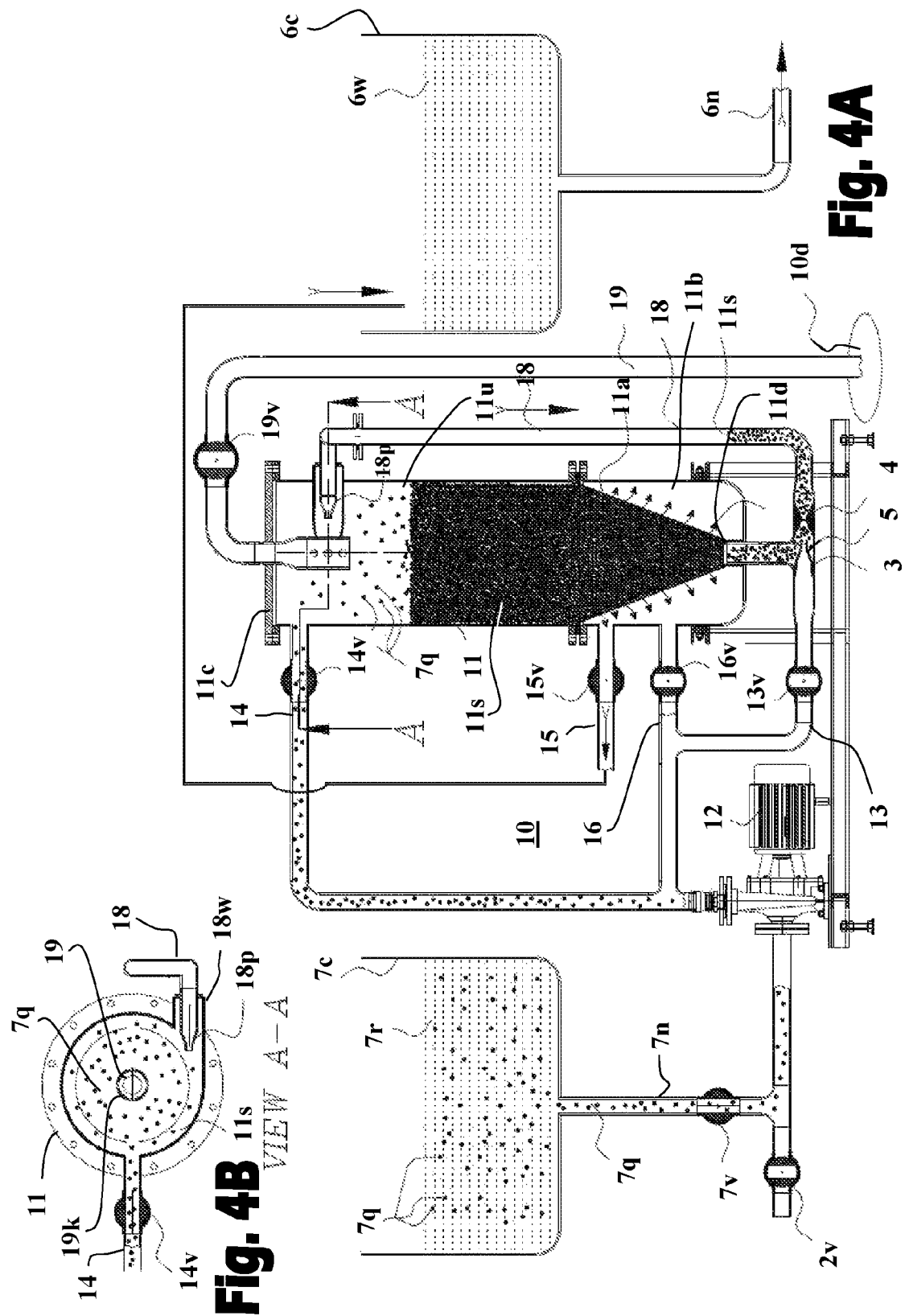

FIGS. 4A and 4B schematically illustrate apparatus 10 operated again in a filtration mode after the filtration medium 11s is refreshed and after optional backwash step(s) employed for removing blockages from perforated funnel 11a (shown in FIGS. 2 and 3). As explained hereinabove, in this mode of operation the valves 2v, 16v, 13v, and 19v, are in a closed state, and valves 7v, 14v and 15v, are in an opened state such that a stream of raw water produced by pump 12 is continuously introduced into the filtration zone 11u of column 11, and filtrate is steamed out from the filtrate zone 11b into filtrate tank 6c.

Filtration column 11 may be made from any material suitable for holding pressures of up to 10 atmospheres, or in some specific embodiments up to 20 atmospheres, if so required, such as for example plastic material and steel, preferably from epoxy coated steel. In a specific preferred embodiment of the invention filtration column is made from a cylindrical container having a diameter of about 0.5 to 3 meters and height of about 1 to 3 meters. The pores in perforated funnel are generally about 200 micron. Filtering grains are preferably sand grains having a diameter of about 0.5 to 5 mm.

The suction chamber 5b may be made from stainless steel. The inner diameter of pressure chamber 3 may be of about 50 mm. The diameter of the opening of tapered nozzle 5 is generally about 10 mm, and the fluid velocity discharged through it during the treatment of the filtering grains in the regeneration stage is generally about 30 m/sec. The diameter of slender passage 4 is generally about 10 mm.

The diameter of the opening of tapered nozzle 18p is generally about 15 mm, and the fluid velocity discharged from it during the regeneration stage is generally about 20 m/sec.

EXAMPLE

The filtering apparatus of the invention depicted in FIGS. 1 to 4 was tested in a laboratory setup utilizing a filtering column (0.5 m in diameter and 1.5 in height) as described hereinabove filled with about 100 liter of sand used as a filtering medium. Raw water continuously streamed through sand eventually clogged the filtering medium such that a pressure gradient of about 0.5 bar evolved in the filtering column. The filtering medium was then refreshed by means of a suction chamber as described hereinabove fed by a stream of water having flow velocity of about 10 msec, which provided flow velocity of a about 30 msec through the tapered nozzle of the suction chamber. The filtering medium was satisfactorily cleaned within a single cycle of the filtering medium through the circulation line by streaming 700 liters of water which is almost 10% of the quantity of water required for regenerating such filtering medium in conventional washing methods.

Figure 5:
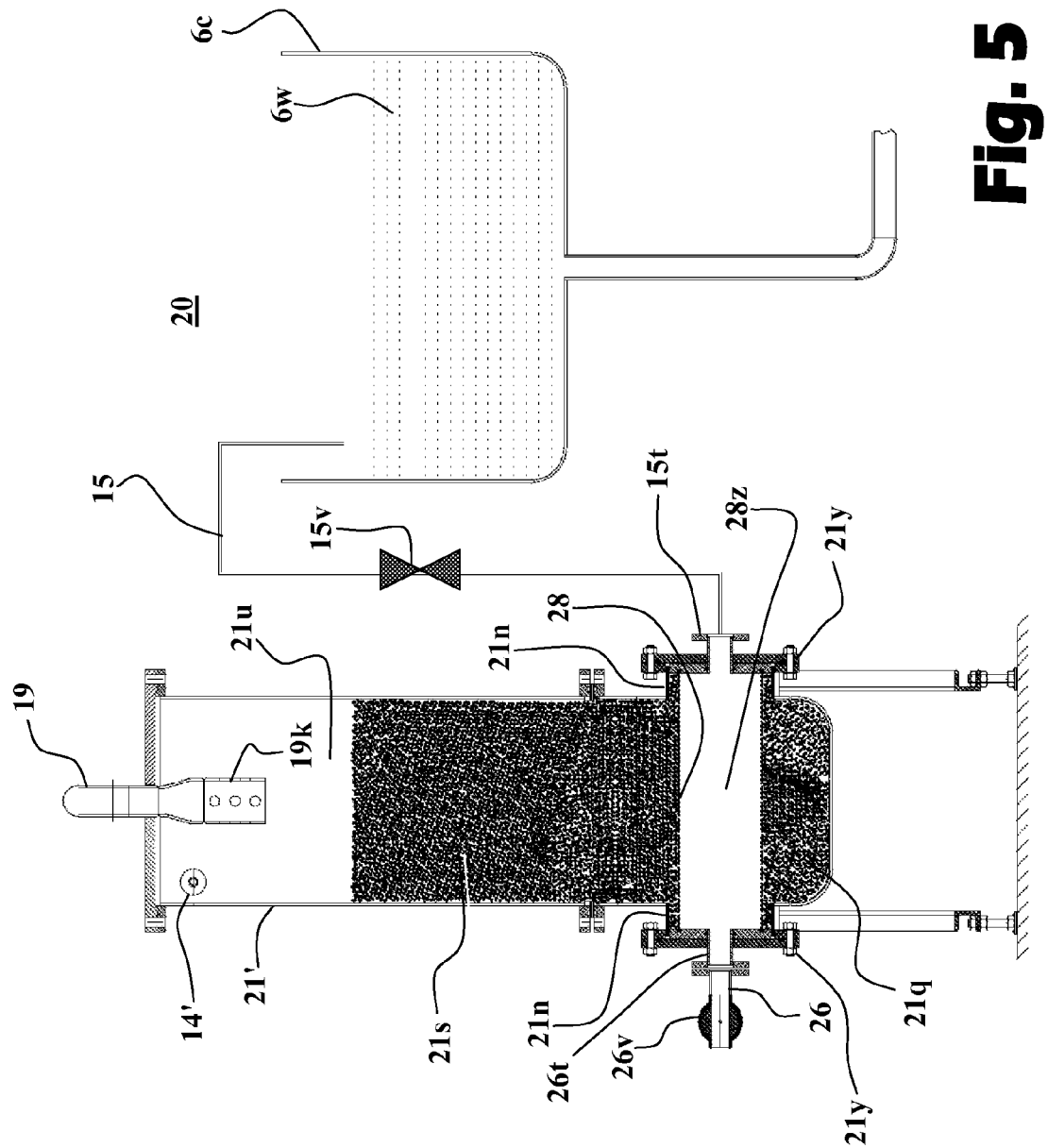
FIG. 5 schematically illustrates another preferred embodiment of the filtration apparatus of the invention wherein the filtrate zone is defined by a hollow perforated member located inside the filtration zone.

FIG. 5 schematically illustrate a filtration apparatus 20 according to another preferred embodiment of the present invention, wherein the filtrate zone 28z is defined by a perforated hollow member 28 mounted inside filtration column 21' and designed to prevent passage of filtration grains 21s from the filtering zone 21u into the filtrate zone 28z. Perforated hollow member 28 is preferably fixated inside filtration column 21' by means of lateral mounting ports 21y provided over two lateral openings 21n formed in opposing sides of filtration column 21', and configured to allow easy and fast removal and replacement of hollow perforated member 28 therethrough, and for monitoring replacing the filtration medium, whenever required. Filtering media grains 21s should fill a substantial portion of the volume of the filtering zone 21u, at least sufficient for covering perforated hollow member 28, preferably filling about ⅔ of the volume of the filtering zone 21u.

Mounting port 21y at one side of filtration column 21' comprises a fluid outlet 15t employed for streaming the filtrate to filtered-water tank 6c through pipeline 15 attached to it. The mounting port 21y at the other side of filtration column 21' comprises a fluid inlet 26t configured for carrying out backwashes, if needed, by streaming fresh water through backwash pipe 26 into filtrate zone 28z, by opening backwash valve 26v provided thereon and closing valve 15v provided on pipeline 15. This specific preferred embodiment of the invention does not include means for treating clogged filtering grain media, and accordingly the base of filtration volume 21' is sealed.

Figure 6:
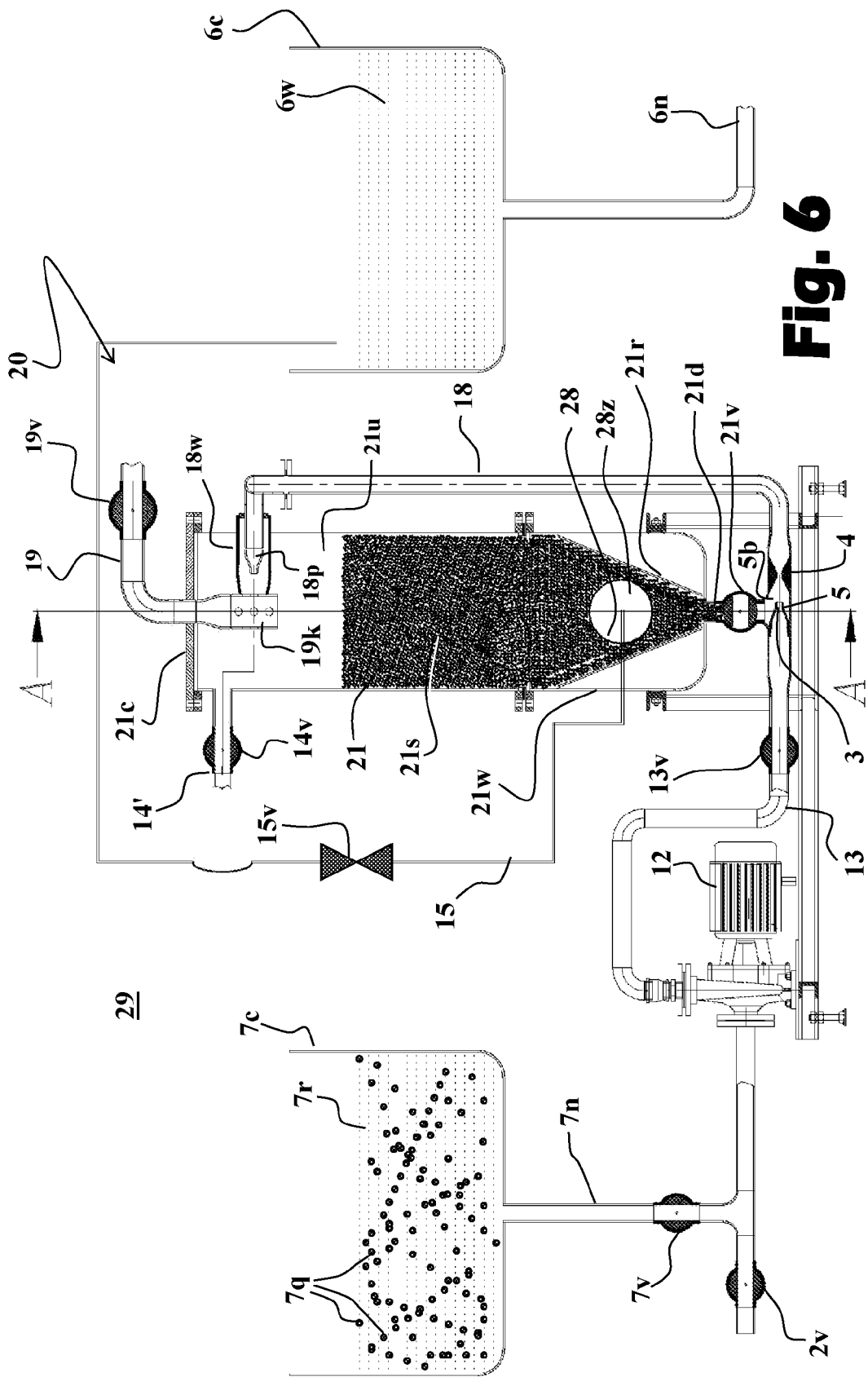
FIG. 6 schematically illustrates a filtration system based on the embodiment of the filtration apparatus illustrated in FIG. 5 further comprising a pressure reducing device and circulation line for treating the filtration medium.

FIG. 6 schematically illustrates a filtration apparatus 29 utilizing a filtration column 21 in which the filtrate zone 28z is defined by a hollow perforated member 28 mounted inside filtration column 21, and further comprising a suction chamber 5b for treating the filtration medium 21s. In this example filtration column 21 is also filled with filtration medium 21s up to about ⅔ of its height in order to substantially cover hollow perforated member 28.

Perforated hollow member 28 is preferably located in a tapering portion 21t located at the bottom section of filtration column 21 inside the filtering zone 21u. In this example the tapering is constructed by means of slanted surfaces 21r (and 21q in FIGS. 7A, 7B and 7D), thereby defining an empty space 21e i.e., not participating in the operation of the apparatus. It is however understood that filtration column may be constructed to include such tapering portion integrally (i.e., without the empty space 21e). Tapering portion 21t is designed to direct filtration medium 21s towards the base of filtration column 21 and into the opening of conduit 21d sealably attached to the base of filtration column 21. As will be now explained, while the structure of filtration column 21 is different than that of filtration column 11 discussed hereinabove with reference to FIGS. 1 to 4, other elements of apparatus 29 referenced by the same numerals are of the same structure and functionality as those of apparatus 10 and thus they will not be discussed in details hereinbelow for the sake of brevity.

In this preferred embodiment the passage of filtration medium 21s into suction chamber 5b is further controlled by means of valve 21v provided in conduit 21d. Accordingly, when treatment of the filtration medium 21s is performed, tap-water valve 2v, suction chamber valve 13v and valve 21v are in an opened stated for streaming tap water into suction chamber 5b by means of pump 12, and the filtration process of raw water 7r in this preferred embodiment is carried out in a substantially similar fashion to that described hereinabove with reference to FIGS. 1 to 4. The main differences are that the raw water 7r may be introduced through pipeline 14', and that the filtrate is streamed from perforated hollow member 28 into filtered-water tank 6c through pipeline 15.

Figure 7D:
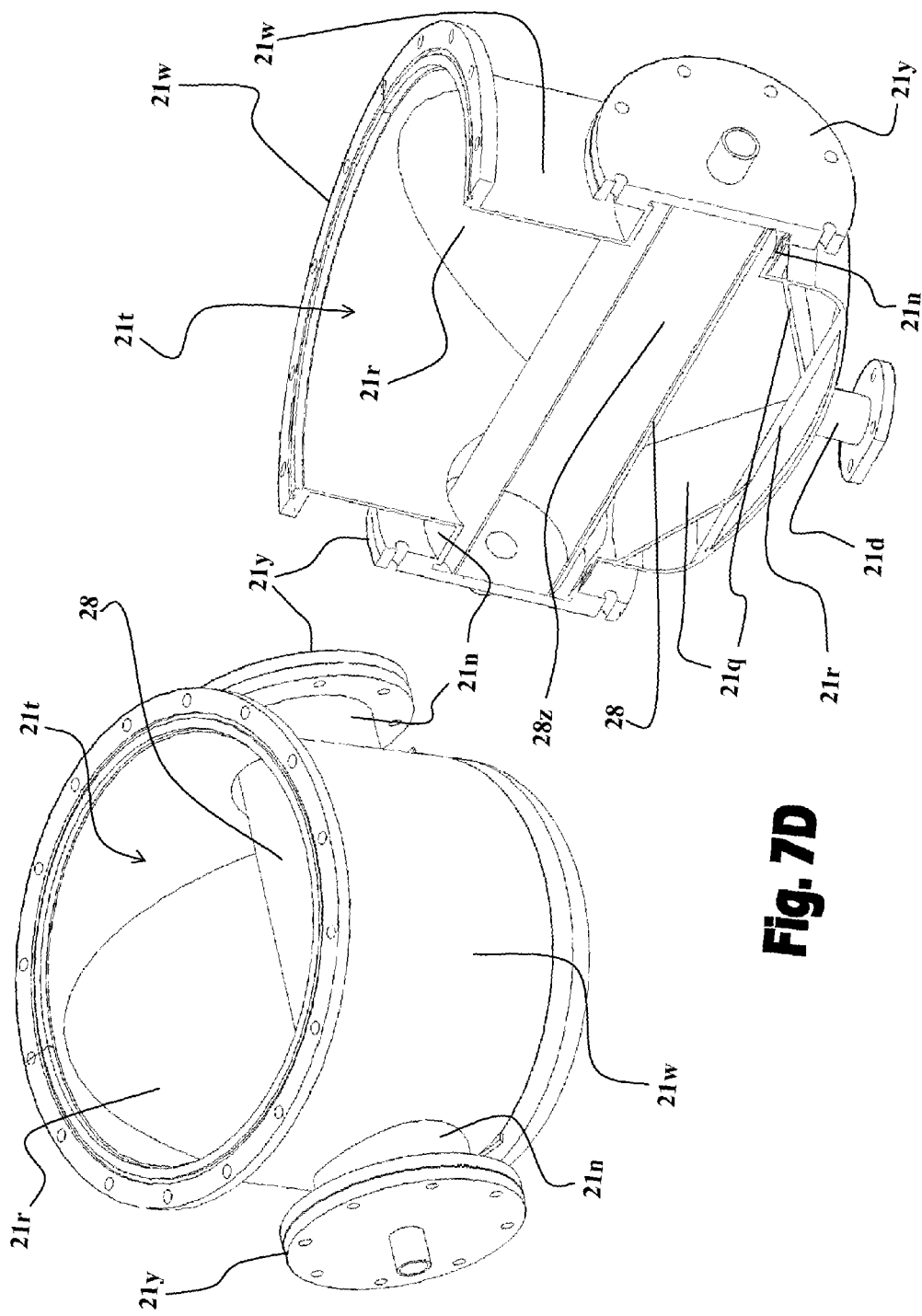

FIGS. 7A to 7D provide further views of the filtration column 21 shown in FIGS. 5 and 6. FIG. 7A shows a sectional side view of the filtration column 21 without the filtration medium. FIG. 7B shows another sectional side view of filtration column 21 of the apparatus 29 rotated by 90°, showing filtration zone 28z implemented by means of a perforated hollow member 28 fixedly attached in opposing sides of tapering portion 21t substantially in perpendicular to the longitudinal axis of filtration column 21. The external surface of perforated hollow member 28 may be covered by one or more spatially curvatured net(s) (22 in FIG. 2D, e.g., using an interwoven net) and/or one or more fine net(s) 24, designed to allow fluid flow through it, and through perforated hollow member 28 into filtrate zone 28z, even if the spatially curvatured net(s) becomes covered by the filtration granules, as discussed hereinabove with reference to FIG. 2D.

FIG. 7C illustrates a cross-sectional view of the upper section of filtering column 21 comprising drain line 19, suction port 19k, circulation inlet 18w, and inlet pipe 14', as in apparatus 10 described with reference to FIGS. 1 to 4. As shown in FIG. 6, pipe line 14' is not connected by means of pump 12 to the raw water tank 7c, pipe line 14' preferably supplies a stream of raw water 7r provided by other means (not shown).

FIG. 7D shows perspective and sectional views of the bottom part 21w of the filtration column 21. As seen, in this preferred embodiment tapering portion 21t is constructed from two pairs of slanted surfaces; slanted surfaces 21q mounted in opposing relationship in bottom part 21w beneath and along the length of perforated hollow member 28, and slanted surfaces 21r mounted in opposing relationship in bottom part 21w in parallel to the longitudinal axis of perforated hollow member 28. In this configuration the upper portions of slanted surfaces 21r extend above hollow member 28 such that the tapering portion 21t defined accommodates perforated hollow member 28 while maximizing the contact of its external surface with the filtration medium.

The dimensions of filtration column 21 may be more or less the same as those of filtration column 11 discussed hereinabove with reference to FIGS. 1 to 4. In a preferred embodiment of the invention perforated hollow member 28 is made of a perforated cylindrical element made from a plastic or metallic material, preferably from stainless steel 316, or specific materials suitable for treating certain types of fluids to be filtered. The length of perforated hollow member 28 is adjusted according to the diameter of filtration column 21, its diameter may generally be in the range of 100 to 300 mm, and pores provides in its walls may generally be in the range of 3 to 6 mm.

The operation of filtration apparatus 29 is substantially similar to the operation of filtration apparatus 10 described hereinabove, which will be only briefly explained now. Raw water 7r from raw-water tank 7c streamed into filtration column 21 through pipeline 14' (or through circulation line 18) pass through filtration medium 21s and the pores of perforated hollow member 28 into the filtrate zone 28z inside perforated hollow member 28. Since valve 26v is in a closed state during the filtration process the filtrate obtained in the filtrate zone 28z is streamed through pipe 15 into filtered-water tank 6c by having valve 15v in an open state. It was found that this configuration of the filtrate zone is more reliable and easier to maintain due to the firmness obtained when employing the hollow perforated body 28, in particular when it is embodied in a form of a cylindrical hollow perforated element, which showed improved tolerance and longevity of the hollow perforated element in moderate to high operational pressure differences (e.g., pressure drops of about 0.5 to 3 Bar).

It is noted that carrying out backwash operations with the apparatus of the present invention via perforated funnel 11a, or via the pores of perforated hollow member 28 is substantially beneficial in comparison to the backwashes performed in the prior art apparatuses via nozzles, since the use of perforated elements (e.g., 11a or 28) prevents formation of channels in the filtration medium, and thus maintain efficient filtration conditions and prolonged filtration cycles.

The flow rate of raw water stream introduced into filtration apparatus 21 may generally be in the range of 3 to 50 m$^3$/Hr.

One of the major advantages of the filtration apparatus 29 of the invention is in its ability to carry out filtration during the filtration medium treatment. More particularly, the water filtration and filtration medium treatment operations may be carried out concurrently, for example, by streaming raw water 7r into filtration column 21 through pipeline 14' and concurrently streaming tap city water into suction chamber 5b through pipeline 13 i.e., having valves 2v, 13v, 14v, 15v, 21v and 19v in an opened state, and valve 7v in a closed state.

Optionally, in certain applications raw water 7r may be used for refreshing the filtration medium, instead of using fresh city tap water. Advantageously, in such applications filtration apparatus 29 may be also operated concurrently in the filtering mode and in the filtration medium treatment mode i.e., by setting valves 7v, 13v, 14v, 15v, 21v and 19v in an opened state, and valve 2v in a closed state. It is noted that the use of valve 13v in filtration apparatus 29 is optional, or alternatively, valve 13v may be a one way valve configured to prevent back flows in pipeline 13 in the direction of pump 12, or yet alternatively, valve 13v may entirely removed.

Furthermore, it was noticed that only the upper layer of the filtration medium containing about 20% of filtration medium actively participate in the filtration process. Accordingly, a typical filtration medium treatment cycle in accordance with the present invention may be operated for treating only about 20% of the filtration medium. In this way only 20% of the filtering granules in the lower portion of the filtration medium are treated in each cycle thereby providing a refreshed upper layer of filtering granules, while substantially saving in the amounts of tap water required in each the filtration medium treatments. Accordingly, while a filtration medium treatment cycle in the filtration apparatus of the present invention in which the entire amount of filtration medium is treated requires about 5% of the tap water required in conventional sand filtration apparatuses, when operating the filtration apparatus in a filtration medium treatment mode in which about 20% of the filtration medium is treated requires about 1% of the amount of water required in conventional sand filtration apparatuses.

FIG. 8 schematically illustrates an embodiment of a suction chamber 5q comprising a tongue element 9. In this preferred embodiment of the invention reduced pressure conditions are produced in pressure chamber 3q by the slender passage 9p obtained by means of tongue element 9.

The slender passage 9p increases the velocity of the water streamed into pressure chamber 3q, which cause suction of filtration granules from via conduit 21d. The increased velocity and turbulent flow produced in the pressure chamber 3q causes separation of filtration residuals in a similar way, as discussed in details hereinabove.

Pressure chamber 3q may further comprise a construction 1 placed upstream thereinside and adapted to increase the velocity of the fluid and filtration media and residues streamed out of pressure chamber 3q into circulation line 18, for further separating the filtration residues from the filtration media. In this example, constriction 1 is provided on one side only of the pressure chamber, which may have a circular or rectangular cross-sectional shape.

All of the abovementioned parameters are given by way of example only, and may be changed in accordance with the differing requirements of the various embodiments of the present invention. Thus, the abovementioned parameters should not be construed as limiting the scope of the present invention in any way. In addition, it is to be appreciated that the different tanks, columns, pipes, and other members, described hereinabove may be constructed in different shapes (e.g. having oval, square etc. form in plan view) and sizes differing from those exemplified in the preceding description.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A filtration apparatus comprising: a filtering column which interior is divided by a perforated partition into a filtrate zone and a filtering zone, wherein said filtering zone is adapted to receive a stream of raw-water and a lower portion of its volume is filled with filtering grains, and wherein said filtrate zone is adapted to receive a filtrate obtained from passage of said stream of raw-water via said filtering grains and said perforated partition; and a pressure reducing device in fluid communication with said lower portion of said filtering zone and with an upper portion thereof, wherein said pressure reducing device is adapted to receive a stream of water and responsively to continuously remove filtering grains from said filtering zone and separate filtration residues therefrom by the reduction of pressure conditions thereinside, and direct a stream comprising said stream of water and said separated filtering grains and filtration residues to said upper portion of said filtering zone;
wherein the pressure reducing device is a Venturi device adapted to receive a stream of water and continuously remove filtering grains from the filtering zone and separate filtration residues therefrom by means of a Venturi effect; and
wherein the Venturi device comprises a pressure chamber having an inlet adapted to receive the stream of water and a tapering outlet adapted to produce the Venturi effect.

2. The apparatus according to claim 1 wherein the pressure reducing device is adapted to generate an increased speed turbulent flow in the stream comprising the filtering grains.

3. The apparatus according to claim 1 wherein the stream comprising the filtering grains and the stream of water is introduced into the upper portion of the filtering zone in a direction substantially tangential to the wall of the filtering column.

4. The apparatus according to claim 3 wherein the stream comprising the filtering grains and the stream of water is introduced into the upper portion of the filtering zone through a nozzle.

5. The apparatus according to claim 3 comprising a drain port centrally located in the upper portion of the filtering zone, said drain port is adapted to direct a stream comprising filtration residues from said filtering zone to drainage.

6. The apparatus according to claim 1 further comprising a pump adapted to produce the stream of raw-water into the filtering zone, and the stream of water passed through the pressure reducing device.

7. The apparatus according to claim 1 wherein the perforated partition comprises one or more nets placed thereon.

8. The apparatus according to claim 7 wherein the one or more nets comprises a fine net placed on the perforated partition, said fine net having holes of about half the size of the granules of the filtration medium, and a spatially curvatured net placed on said fine net, said spatially curvatured net having holes size slightly smaller than the size of the granules of the filtering granules.

9. A filtration apparatus according to claim 1, wherein said perforated partition has a tapering shape which tapers downwardly towards the base of said filtering column.

10. The apparatus according to claim 9 wherein the perforated partition comprises one or more nets placed thereon.

11. The apparatus according to claim 10 wherein the one or more nets comprises a fine net placed on the perforated partition, said fine net having holes of about half the size of the granules of the filtration medium, and a spatially curvatured net placed on said fine net, said spatially curvatured net having holes size slightly smaller than the size of the granules.

12. A filtration apparatus according to claim 1, wherein the Venturi device further comprises a constriction placed near the tapering outlet.

13. A method for refreshing a clogged filtering medium maintained in a filtering column which interior is divided by a perforated partition into a filtrate zone and a filtering zone, wherein said filtering zone is adapted to receive a stream of raw-water and a lower portion of its volume is filled with filtering grains, the method comprising:
providing a Venturi device in fluid communication with said lower portion of said filtering zone and in fluid communication with an upper portion of said filtering zone, said Venturi device is adapted to receive a stream of water and produce a Venturi effect;
directing a stream of water into said Venturi device thereby removing portion of said filtering grains and separating filtration residues therefrom by means of said Venturi effect;
directing a stream comprising said stream of water and said separated filtering grains and filtration residues and introducing it into said upper portion of said filtering zone in a direction substantially tangential to the wall said filtering column thereby causing a circular centrally converging flow of said filtration residues inside said column; and
directing a stream comprising filtration residues from said filtering zone to drainage via a drain port centrally located in the upper portion of the filtering zone.

14. A filtration apparatus comprising: a filtration column having a perforated hollow member mounted inside it to define a filtrate zone therein and a filtering zone in the volume of said filtration column external to said hollow perforated member, wherein a portion of said filtering zone is filled with filtering grains up to a level sufficient for entirely covering said hollow perforated member, and wherein said filtrate zone is adapted to receive a filtrate obtained from passage of a stream of raw-water introduced via the upper portion of the filtration column and passed through the filtering grains and the perforations of the hollow perforated member;

said apparatus further comprising a pressure reducing device in fluid communication with a lower portion of said filtering zone and with an upper portion thereof, wherein said pressure reducing device is adapted to receive a stream of water and responsively to continuously remove filtering grains from said filtering zone and separate filtration residues therefrom by the reduction of pressure conditions thereinside, and direct a stream comprising said stream of water and said separated filtering grains and filtration residues to said upper portion of said filtering zone;

wherein the pressure reducing device is a Venturi device adapted to receive a stream of water and continuously remove filtering grains from the filtering zone and separate filtration residues therefrom by means of a Venturi effect; and wherein the Venturi device comprises a pressure chamber having an inlet adapted to receive the stream of water and a tapering outlet adapted to produce the Venturi effect.

15. The apparatus according to claim 14 wherein the perforated hollow member comprises at least one outlet for streaming filtrate obtained in the filtrate zone to a filtrate reservoir.

16. The apparatus according to claim 14 wherein the perforated hollow member comprises an inlet suitable for streaming fresh water into the filtrate zone for carrying out backwash.

17. The apparatus according to claim 14 further comprising a drain port centrally located in the upper portion of the filtering zone.

18. The apparatus according to claim 14 wherein the perforated hollow member is a cylindrical hollow perforated element which is situated in the filtration column such that the longitudinal axes of said column and said cylindrical element are substantially perpendicular.

19. The apparatus according to claim 14 wherein the external surface of the perforated hollow member is covered by one or more nets.

20. The apparatus according to claim 19 wherein the external surface of the perforated hollow member is covered by at least one fine net and at least one spatially curvatured net.

21. The apparatus according to claim 20 wherein the fine net having holes of about half the size of the granules of the filtration medium, and the spatially curvatured net having holes size slightly smaller than the size of the granules of the filtering granules.

22. The apparatus according to claim 14 wherein the lower portion of the filtration column tapers downwardly to define a tapering passage towards an opening provided in the base of the filtration column.

23. The apparatus according to claim 22 wherein the perforated hollow member is mounted above, or within the tapering passage.

24. The apparatus according to claim 14 comprising slanted surfaces mounted in the lower portion of the filtration column to define a tapering passage for the filtration medium to an opening in the base of the filtration column.

25. A filtration apparatus according to claim 14, wherein the Venturi device further comprises a constriction placed near the tapering outlet.

26. A method for refreshing a clogged filtering medium maintained in a filtering column, the interior of which is divided by a hollow perforated member into a filtrate zone and a filtering zone, wherein said filtering zone is adapted to receive a stream of raw-water and a lower portion of its volume is filled with filtering grains; the method comprising:

providing a Venturi device in fluid communication with said lower portion of said filtering zone and in fluid communication with an upper portion of said filtering zone, said Venturi device is adapted to receive a stream of water and produce a Venturi effect;

directing a stream of water into said Venturi device thereby removing portion of said filtering grains and separating filtration residues therefrom by means of said Venturi effect;

directing a stream comprising said stream of water and said separated filtering grains and filtration residues and introducing it into said upper portion of said filtering zone in a direction substantially tangential to the wall of said filtering column thereby causing a circular centrally converging flow of said filtration residues inside said column; and directing a stream comprising filtration residues from said filtering zone to drainage via a drain port centrally located in the upper portion of the filtering zone.

27. A method according to claim 26, which is carried out concurrently with a filtration of raw water.

* * * * *